US009990525B2

(12) United States Patent
Goosen et al.

(10) Patent No.: US 9,990,525 B2
(45) Date of Patent: Jun. 5, 2018

(54) ON-CHIP OPTICAL INDICATOR OF THE STATE OF THE INTEGRATED CIRCUIT

(71) Applicant: INSiAVA (Pty) Ltd., Pretoria (ZA)

(72) Inventors: Marius Eugene Goosen, Centurion (ZA); Petrus Johannes Venter, Menlo Park (ZA)

(73) Assignee: INSiAVA (Pty) Ltd., Pretoria (ZA)

( * ) Notice: Subject to any disclaimer, the term of this patent is extended or adjusted under 35 U.S.C. 154(b) by 0 days. days.

(21) Appl. No.: 15/315,134

(22) PCT Filed: May 28, 2015

(86) PCT No.: PCT/IB2015/053999
§ 371 (c)(1),
(2) Date: May 12, 2017

(87) PCT Pub. No.: WO2015/181759
PCT Pub. Date: Dec. 3, 2015

(65) Prior Publication Data
US 2017/0185816 A1    Jun. 29, 2017

(30) Foreign Application Priority Data
May 30, 2014  (ZA) .................................. 2014/03994

(51) Int. Cl.
*G06K 7/14*    (2006.01)
*G06K 19/06*    (2006.01)

(52) U.S. Cl.
CPC ..... *G06K 7/1417* (2013.01); *G06K 19/06037* (2013.01)

(58) Field of Classification Search
USPC ........... 235/462.1; 380/28; 359/200.6, 200.7, 359/200.8
See application file for complete search history.

(56) References Cited

U.S. PATENT DOCUMENTS

| 5,003,251 A | 3/1991 | Fuoco |
| 6,393,183 B1 | 5/2002 | Worley |
| 6,410,941 B1 | 6/2002 | Taylor et al. |
| 2004/0138845 A1 | 7/2004 | Park et al. |
| 2005/0253136 A1 | 11/2005 | Ono et al. |
| 2008/0185618 A1 | 8/2008 | Chu et al. |
| 2012/0194565 A1 | 8/2012 | White et al. |
| 2013/0328416 A1 | 12/2013 | Whitworth et al. |

OTHER PUBLICATIONS

International Search Report from parent PCT application PCT/IB2015/053999 dated Oct. 1, 2015.
International Preliminary Report on Patentability from parent PCT application PCT/IB2015/053999 dated May 31, 2016.

*Primary Examiner* — Allyson Trail
(74) *Attorney, Agent, or Firm* — Foley Hoag LLP; Dana M. Gordon; Rajesh Vallabh

(57) ABSTRACT

An integrated circuit (IC) having an on-chip electroluminescent silicon light source arrangement is disclosed. In the IC, the light source arrangement is a two-dimensional display arrangement and the IC includes an on-chip modulator operable to modulate data indicative of a state of the IC which can be displayed by the display arrangement, thereby providing an optical representation of the state of the IC.

16 Claims, 3 Drawing Sheets

ON-CHIP OPTICAL INDICATOR OF THE STATE OF THE INTEGRATED CIRCUIT

RELATED APPLICATIONS

This application is the U.S. national phase of International Patent Application No. PCT/IB2015/053999, filed May 28, 2015, which claims the benefit of South Africa patent application 2014/03994, filed on May 30, 2014.

FIELD OF DISCLOSURE

This disclosure relates to an integrated circuit having an on-chip electroluminescent silicon light source arrangement which can provide an optical indication of the state of the integrated circuit.

BACKGROUND OF DISCLOSURE

Historically, integrated circuit (IC) display has been realised by means of an IC, an optical driver which may be integral with the IC or a discrete component, and a discrete optical emitter. With recent advances in IC design, silicon light sources have been integrated with the IC itself and this is referred to as an on-chip light source. A number of approaches exist where a silicon-compatible light source is integrated with a silicon substrate [1].

For complete integration, light sources should ideally be created using structures available in a standard CMOS/BiCMOS or SOI process used for typical ASIC integrated circuits. These include analogue, digital and mixed signal integrated circuits.

There are generally two methods by which to generate light in a standard CMOS integrated circuit where no hybridisation is necessary:

Radiative recombination of minority carriers through forward biased injection in a silicon pn-junction; and
Radiative carrier interactions under high electric fields, observable when inducing carrier transport through reverse biased pn-junctions in avalanche breakdown.

The first technique emits light invisible to the human eye with a photon energy distribution around the band gap energy of silicon (approximately 1100 nm). The second technique emits a broad spectrum of light in the region of 400-900 nm, depending on the electric field profile. The current disclosure pertains to the second technique which emits visible light that is also capable of being detected by silicon itself. This is a unique feature of the disclosure described below.

Scientific advances in hot carrier electroluminescent light sources have enabled detectable light emission from light sources manufactured in silicon. Reducing the voltage and enabling circuit techniques that allow for direct interaction of these light sources with digital circuitry allow for the direct integration of these light sources as circuit components in analogue and digital systems on chip (SoC).

However, almost all of the on-chip light sources of which the Applicant is aware display an image or data (generally, an optical output) based on data which originates externally from the IC itself. In other words, the IC is configured to receive an input indicative of data to be displayed and then translate that input into an optical output via the on-chip light source.

The Applicant desires an IC having an on-chip light source which is operable to display information about the state of the chip itself. An IC, or integrated circuit, is seen as any semiconductor substrate which includes various electrical functions and circuitry, as well as additional functions such as electro-optical capabilities, integrated into a single body of that semiconductor. Examples include, but are not limited to, microprocessors, DRAM chips, dedicated EEPROMs and ASICs. Contactless probing has been explored using on-chip integrated light sources by a few authors in technical literature [2], but all of these rely on using on-chip silicon light sources in a single point in order to transmit information in a temporal one-dimensional manner, that is, by representing data in a linear time evolving sequence of optical pulses.

The Applicant accordingly desires a display arrangement which can display useful information about the state of the IC.

SUMMARY OF DISCLOSURE

Accordingly, the disclosure provides an integrated circuit (IC) having an on-chip electroluminescent silicon light source arrangement, characterised in that:

the light source arrangement is a two-dimensional display arrangement; and
the integrated circuit includes an on-chip modulator operable to modulate data indicative of a state of the integrated circuit for display by the display arrangement, thereby providing an optical representation of the state of the integrated circuit.

It should be noted that the primary function of the IC may not be to display its state. Instead, it may be programmed or configured to perform any number of tasks typically performed by ICs, and then as an adjunct to its primary task, display the optical representation of the state.

The light source arrangement may be a hot carrier electroluminescent light source arrangement. Conventionally, the high voltage required for hot carrier electroluminescence inhibits direct integration on a standard CMOS chip with the possibility of coexisting and interacting with other digital and lower voltage analogue components. Recent developments have allowed the latter to become possible and feasible.

The IC may have silicon as the body of semiconductor material. The IC may be manufactured in a standard CMOS process. The IC may be manufactured in a standard SOI-CMOS process.

The optical representation may include a human-readable representation. The optical representation may include alphanumeric characters or symbols recognisable to a chip developer or programmer. Instead, or in addition, the optical representation may include a machine-readable representation. Examples of two-dimensional (2D) machine-readable representations include QR codes or other two-dimensional barcodes.

The optical representation may be readable by a detector external to the IC. The detector may be a human. Instead, or in addition, the detector may be a computerised optical scanner, e.g., a 2D barcode reader.

It will be appreciated that by means of a detector (whether human or machine), the need for electrical probing may be eliminated. The IC may include an input arrangement, e.g. a photodetector, operable to receive a feedback signal from the detector.

The optical representation may be static. Instead, the optical representation may be dynamic or time-varying.

Differently stated, the optical representation may be of data associated internally with, or originating internally from, the IC. The data represented may be used for debugging or fault analysis of internal circuits or circuit elements by representing the scan path or similar JTAG elements of large digital circuits. Additionally, it may even become possible to reduce or eliminate certain diagnostic circuitry typically present on chip by providing a more efficient means of communicating off-chip.

It may be possible to monitor, represent, and display integrated registers (such as a stack of a microprocessor or states of certain data registers) used in the processing function of microprocessors. This may be a valuable means for in-circuit debugging and may assist to improve the quality of development enabling a developer to view the chip state directly on the IC. Internal memory element contents, such as the information stored in DRAM or SRAM, may be represented by the optical representation. This may render it possible to display private messages stored in on-board memory, replay stored data, and relay data stored from other originating sources, such as sensor inputs, for in situ observation. Educational and demonstrative use of the IC may assist an observer to understand the internal operation of ASICs, microprocessors, and FPGAs.

This disclosure may provide for a high information density transmission of the state with no need to extract the information electrically from the integrated circuit. This may result in faster IC testing operations (for example for informational or quality control purposes) before shipment, or to simply reduce the I/O count of the IC. Since the observer can be a human being, the eye being the detector, it is possible to effectively represent on-chip states in a format readable by humans.

The term "state" may include a representation of electrical conditions of circuit elements within the IC, such as the value of analogue voltages and currents of internal nodes and/or the values represented by digital circuit elements of both static and dynamic nature. The term "state" may include one or more of:

information pertaining to memory contents of the integrated circuit;
  information pertaining to a scan path used for integrated circuit debugging; or
  information pertaining to a past or present state of the integrated circuit.

Two-dimensional display arrangements per se are not novel. Light sources that have been fabricated by using devices, structures and features that are part of a standard CMOS process, have been disclosed [3, 4]; importantly, however, these only represented information sourced externally from the IC.

The modulator may be analogue or digital. Information displayed by the display arrangement may be encoded to increase information transfer density.

The disclosure extends to a detection system which includes:

an IC as defined above operable to display a machine-readable representation; and
  a computerised detector operable to read the machine-readable representation.

The disclosure extends to a method of representing a state of the IC as defined above, the method including:

modulating, by means of a modular, data indicative of a state of the integrated circuit; and
  displaying the data in two dimensions on the display arrangement, thereby providing an optical representation of the state of the integrated circuit.

BRIEF DESCRIPTION OF DRAWINGS

The disclosure will now be further described, by way of example, with reference to the accompanying diagrammatic drawings.

In the drawings.

DETAILED DESCRIPTION OF EXAMPLE EMBODIMENT

The following description of the disclosure is provided as an enabling teaching of the disclosure. Those skilled in the relevant art will recognise that many changes can be made to the embodiment described, while still attaining the beneficial results of the present disclosure. It will also be apparent that some of the desired benefits of the present disclosure can be attained by selecting some of the features of the present disclosure without utilising other features. Accordingly, those skilled in the art will recognise that modifications and adaptations to the present disclosure are possible and can even be desirable in certain circumstances, and are a part of the present disclosure. Thus, the following description is provided as illustrative of the principles of the present disclosure and not a limitation thereof.

Figure 1:
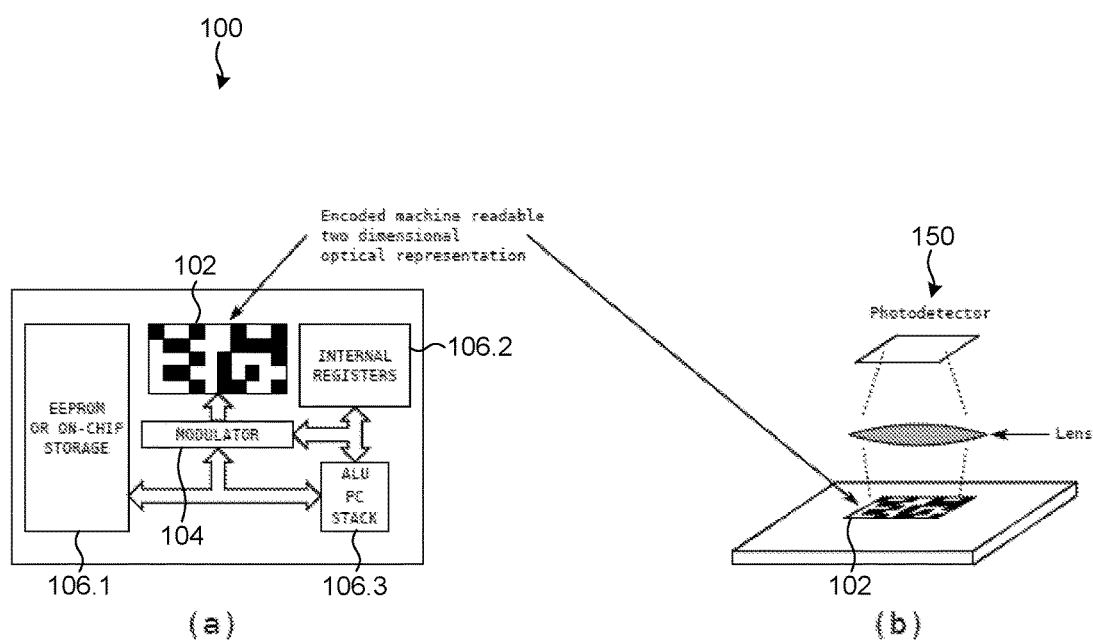
FIG. 1 shows a schematic view of a first embodiment an IC in accordance with the disclosure.

FIG. 1 illustrates a first embodiment of an IC 100 in accordance with the disclosure. The IC 100 has an on-chip electroluminescent silicon light source arrangement which is a two-dimensional display arrangement 102. The display arrangement 102 can present a simple monochrome display.

The IC 100 also has an on-chip modulator 104 which is operable to modulate data indicative of a state of the IC 100 for display by the display arrangement 102, thereby providing an optical representation of the state of the IC 100. The data may originate from a number of potential on-chip sources, such as on-chip storage (e.g., an EEPROM) 106.1, internal registers 106.2, or an internal stack 106.3. Accordingly, instead of the data for display originating from an external source (as is the case with all other two-dimensional ICs of which the Applicant is aware), the data originates from within the IC 100, hence being indicative of a state of the IC 100.

In this embodiment, the modular 104 is configured to display a machine-readable version of the state of the IC 100. Accordingly, to an untrained human eye, the pattern on the display may look like a matrix of random squares, similar to a QR code. However, to a complemental computerised detector 150 having an optical stack and photodetector combination, the optical representation on the display arrangement 102 can be imaged, interpreted, and (if desired) acted upon. The form of the detector 150 is not prescribed. For example, it could resemble a barcode scanner which can be wielded by an operator, or it could be integrated into part of an automatic production process.

Aside from the display arrangement 102 and the modulator 104, the IC 100 resembles a typical microprocessor.

Figure 2:
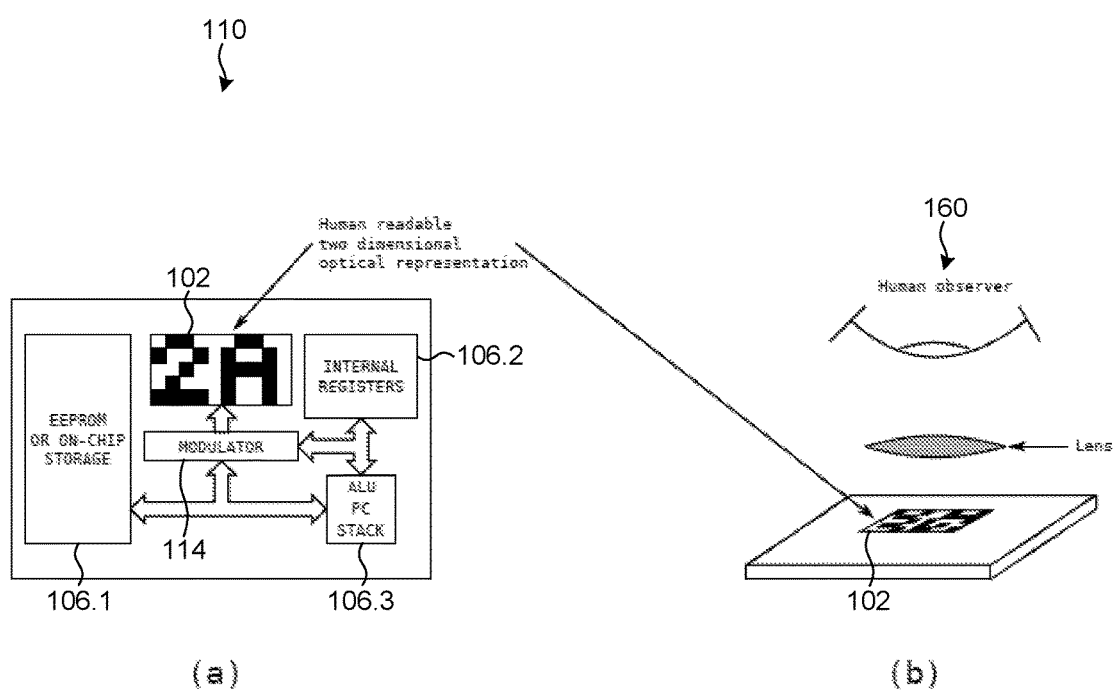
FIG. 2 shows a schematic view of a second embodiment an IC in accordance with the disclosure.

FIG. 2 illustrates a slightly different embodiment of an IC 110 in accordance with the disclosure. In the FIGS, the same numerals refer to the same or similar parts. The IC 110 differs from that of FIG. 1 in that a modulator 114 has been configured to provide human readable indicia on the display arrangement 102. The remaining components are otherwise identical.

The modulator 114 can display, for example, alphanumeric characters on the display arrangement 102. In the illustrated example, "2A" is displayed. The resolution is about 5×10 and there is thus not much available space but it can still be read by a human eye 160. In other embodiments, the resolution of the display arrangement 102 could be higher. The information displayed ("2A") could be indicative of data originating in any of the internal structures 106.1-106.3 which is indicative of the state of the IC 110.

Figure 3:
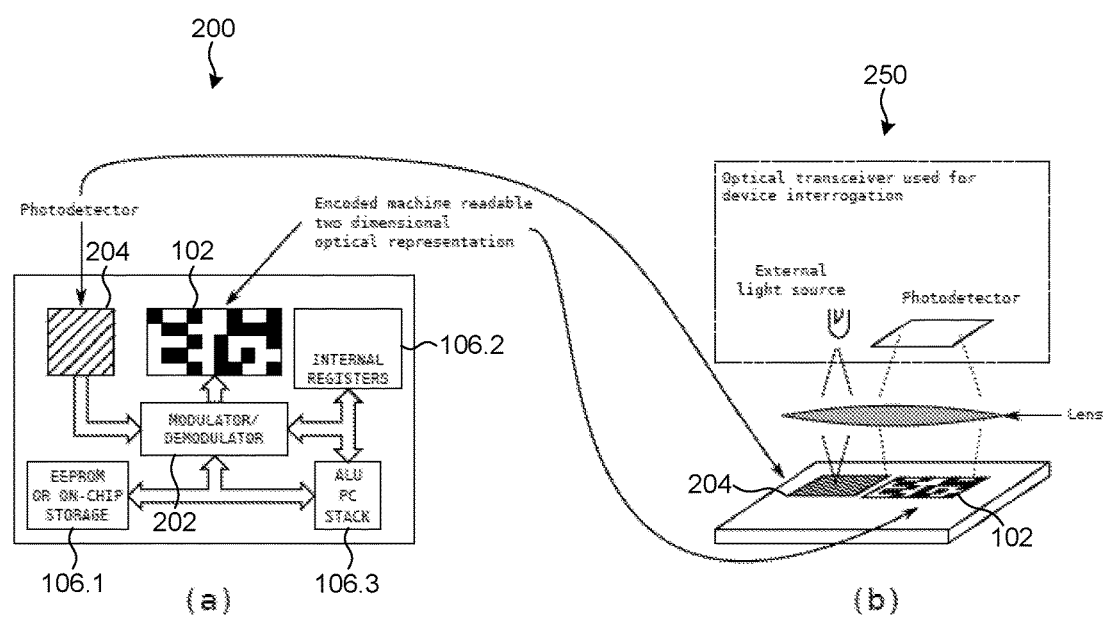
FIG. 3 shows a schematic view of a third embodiment an IC in accordance with the disclosure.

FIG. 3 illustrates a third and more developed embodiment of an IC 200 in accordance with the disclosure. The IC 200 has a modulator/demodulator 202 and an input arrangement in the form of a photodetector 204. Instead of a mere detector 150 as in FIG. 1, there is an interrogator 250 which, in addition to an optical stack and photodetector combination, includes a phototransmitter or other light source to communicate to the IC 200 via the photodetector 204. Accordingly, complete two way interrogation is possible without electrically interacting with the IC 200 through conventional I/O methods.

The Applicant believes that the disclosure as exemplified is advantageous as it provides an IC 100, 110, 200 which can, without physical or electrical contact, display pertinent information relating to its state. This can include data relevant to a manufacturer, programmer, user, etc. The state can include information pertaining to memory contents, a scan path used for integrated circuit debugging, a past or present state of the IC 100, 110, 200.

No extraneous components are required, because the display arrangement 102 is on-chip. Information can thus be displayed quickly, accurately, and securely.

REFERENCES

[1] A. Fang, H. Park, O. Cohen, R. Jones, M. Paniccia, and J. Bowers, "Electrically pumped hybrid AlGaInAs-silicon evanescent laser," Opt. Express 14, 9203-9210, 2006.
[2] S. Sayil, D. Kerns, and S. Kerns, "All-silicon optical contactless testing of integrated circuits," International Journal of Electronics, vol. 89, no. 7, pp. 537-547, 2002.
[3] A. R. Chen, A. I. Akinwande, and H.-S. Lee, "CMOS-based microdisplay with calibrated back-plane," IEEE J. Solid-State Circuits, vol. 40, no. 12, pp. 2746-2755, December 2005.
[4] P. J. Venter, A. C. Alberts, M. du Plessis, T.-H. Joubert, M. E. Goosen, C. Janse van Rensburg, P. Rademeyer and N. M. Fauré, "A CMOS microdisplay with integrated controller utilizing improved silicon hot carrier luminescent light sources," in Proc. SPIE 8643, Advances in Display Technologies III, 864309, 2013.

The invention claimed is:

1. An integrated circuit (IC), comprising an on-chip electroluminescent silicon light source arrangement, wherein:
    the light source arrangement is a two-dimensional display arrangement; and
    the integrated circuit comprises an on-chip modulator operable to modulate data indicative of a state of the integrated circuit which can be displayed by the display arrangement, thereby providing an optical representation of the state of the integrated circuit.

2. The IC of claim 1, wherein the light source arrangement is a hot carrier electroluminescent light source arrangement.

3. The IC of claim 1, wherein silicon is the body of semiconductor material and which is manufactured in a standard CMOS process or SOI-CMOS process.

4. The IC of claim 1, wherein the optical representation includes a human-readable representation.

5. The IC of claim 4, wherein the optical representation includes alphanumeric characters or symbols.

6. The IC of claim 1, wherein the optical representation includes a machine-readable representation.

7. The IC of claim 6, wherein the optical representation includes a two-dimensional barcode.

8. The IC of claim 1, wherein the optical representation is static.

9. The IC of claim 1, wherein the optical representation is dynamic or time-varying.

10. The IC of claim 1, in which the state includes a representation of electrical conditions of circuit elements within the IC.

11. The IC of claim 10, wherein the state includes at least one of:
    information pertaining to memory contents of the integrated circuit;
    information pertaining to a scan path used for integrated circuit debugging; and
    information pertaining to a past or present state of the integrated circuit.

12. The IC of claim 1, wherein the modulator is analogue or digital.

13. The IC of claim 1, wherein information displayed by the display arrangement is encoded to increase information transfer density.

14. A detection system including:
    an IC of claim 1, operable to display a machine-readable representation; and
    a computerized detector operable to read the machine-readable representation.

15. A method of representing a state of the IC of claim 1, the method including:
    modulating, by the on-chip modulator, data indicative of a state of the integrated circuit; and
    displaying the data in two dimensions on the display arrangement, thereby providing an optical representation of the state of the integrated circuit.

16. The IC of claim 1, wherein the integrated circuit is of a single body of semi-conductor, and the light source arrangement is formed in the single body.

* * * * *